United States Patent

[11] 3,544,022

| | | |
|---|---|---|
| [72] | Inventors | Michael Weston Jones Drotiwich; John Gordon Hardwick, Kidderminster, England |
| [21] | Appl. No. | 750,292 |
| [22] | Filed | Aug. 5, 1968 |
| [45] | Patented | Dec. 1, 1970 |
| [73] | Assignee | Imperial Metal Industries (Kynoch) Limited Witton, Birmingham, Warwickshire, England a corporation of Great Britain |
| [32] | Priority | Aug. 8, 1967 |
| [33] | | Great Britain |
| [31] | | No. 36360/67 |

[54] STRUCTURES
3 Claims, 3 Drawing Figs.

[52] U.S. Cl. .................................................. 220/23.4
[51] Int. Cl. .................................................. B65d 21/02

[50] Field of Search .......................................... 220/23.2, 23.4, 5, 5A, 1B, 9F

[56] References Cited
UNITED STATES PATENTS

| | | | |
|---|---|---|---|
| 2,927,452 | 3/1960 | Von Heidenstam .......... | 220/1(B)UX |
| 3,104,758 | 9/1963 | Allen ............................ | 220/23.2X |
| 3,166,212 | 1/1965 | Resos ........................... | 220/23.4 |
| 3,228,549 | 1/1966 | Courtney ...................... | 220/3 |
| 3,288,319 | 11/1966 | Cuhill ........................... | 217/12 |
| 3,383,004 | 5/1968 | Closner ........................ | 220/9(F)UX |

Primary Examiner—George E. Lowrance
Attorney—Cushman, Darby & Cushman

ABSTRACT: A space satellite structure, preferably of plastics materials, comprises a column of polygonal cross section and a plurality of panel members projecting radially from the column, each panel member lying in a plane containing an edge of the polygonal column and being secured to two adjoining sides defining said edge.

Patented Dec. 1, 1970

3,544,022

INVENTORS
MICHAEL WESTON JONES
JOHN GORDON HARDWICK

BY Cushman, Darby & Cushman
ATTORNEYS 3,544,022

STRUCTURES

BACKGROUND OF THE INVENTION

This invention relates to structures which must withstand centrifugal forces arising from spinning of the structure and in particular relates to space vehicles and space satellites.

Satellites for conveying instruments through and beyond the earth's atmosphere are known comprising an arrangement of metal panels in a cruciform configuration, the panels being connected one with another along the axis of the cruciform by bonding and bolting angle brackets to adjacent edge portions of adjacent panels. The various instruments constituting the payload of the satellite are secured to the panels by suitable clips or supports. In use, spinning of the satellite about its longitudinal axis creates centrifugal forces arising from the eccentric location of the instruments and panels with respect to the longitudinal axis of the satellite structure and such forces are transmitted to the bonded and bolted portions of the panels, and to their cut edges. However, the bonded surfaces although having a high resistance to shear stress, i.e. tangential to said surfaces, are relatively weak in tension when components of force are exerted in a direction normal to the bonded surfaces and consequently the bonded surfaces tend to peel apart, particularly if low modulus material is used. Hence the centrifugal forces are resisted principally by the tensile strength of the bolts.

In particular if a similar structure is made in plastics material, e.g. glass reinforced plastics, the requirement for bolts to resist the centrifugal forces necessitates bolt holes in the plastics material, and this seriously reduces the static and fatigue strength of the structure, as does the presence of stressed cut edges.

An object of the present invention is to obviate the necessity to use bolts to secure the panels in their relative positions and hence avoid the necessity for bolt holes in the panels of the structure, and to reduce peeling forces associated with the use of bonding.

SUMMARY OF THE INVENTION

In accordance with the invention a structure for withstanding the centrifugal forces arising from spinning of the structure comprises a column of which the outer surface is polygonal so as to have a plurality of straight edges each defined by corresponding two adjoining flat sides, and a plurality of panel members each projecting radially from the column in a corresponding plane containing a respective one of the straight edges, and each panel member being secured to the two sides defining said one of the straight edges.

The use of a column having a polygonal surface enables the tensile force imposed on a junction between the column and a panel member to be minimised and consequently allows a panel member to be secured to the column without the necessity for bolts, and hence of bolt holes, in the panel. With this construction bonding means alone can be used, and the peeling forces derogatory thereto are reduced.

If required the structure may comprise a plurality of the columns referred to in the next but one preceding paragraph, at least one of the panels being connected between two adjacent columns to connect them together.

Preferably the panels each comprise two walls which diverge in the vicinity of the column and each divergent portion is secured to a corresponding one of said two sides defining said one of the straight edges.

Preferably also the walls of each panel are spaced from one another by an intermediate layer of foam plastic or metal honeycomb thereby to increase the stiffness of the panel.

In accordance with the invention also a structure for withstanding the centrifugal forces arising from spinning of the structure comprises a column of which the outer surface is polygonal so as to have a plurality of straight edges each defined by corresponding two adjoining flat sides, and a plurality of shell members, each shell member having a radially inner flat surface and a radially outer surface, the ends of the inner and outer surfaces being connected together by two opposed flat walls, the radially inner flat surface of each shell being secured to a corresponding one of the flat sides of the column, the flat walls of adjacent shells being secured together to form panels which extend radially from the column in a corresponding plane containing a corresponding one of the straight edges of the column.

In accordance with the invention also a method of manufacturing a structure for withstanding centrifugal forces arising from spinning of the structure comprises forming a column of which the outer surface is polygonal so as to have a plurality of straight edges each defined by corresponding two adjoining flat sides, forming a plurality of shells each comprising a radially inner flat surface and a radially outer surface, the ends of the inner and outer surfaces being connected together by two opposed flat walls, disposing said shells around the column so that the radially inner flat surfaces locate against corresponding ones of the sides of the column and adjacent walls of adjacent shells are parallel so as to form panels which extend radially from the column in a corresponding plane containing a corresponding one of the straight edges of the column, securing the radially inner flat surfaces to corresponding ones of said column, and securing the adjacent walls of adjacent shells to one another.

BRIEF DESCRIPTION OF THE DRAWINGS

In order to make the invention more clearly understood, two embodiments will now be more particularly described with reference to the accompanying drawings in which.

DESCRIPTION OF THE PREFERRED EMBODIMENTS

Figure 1:
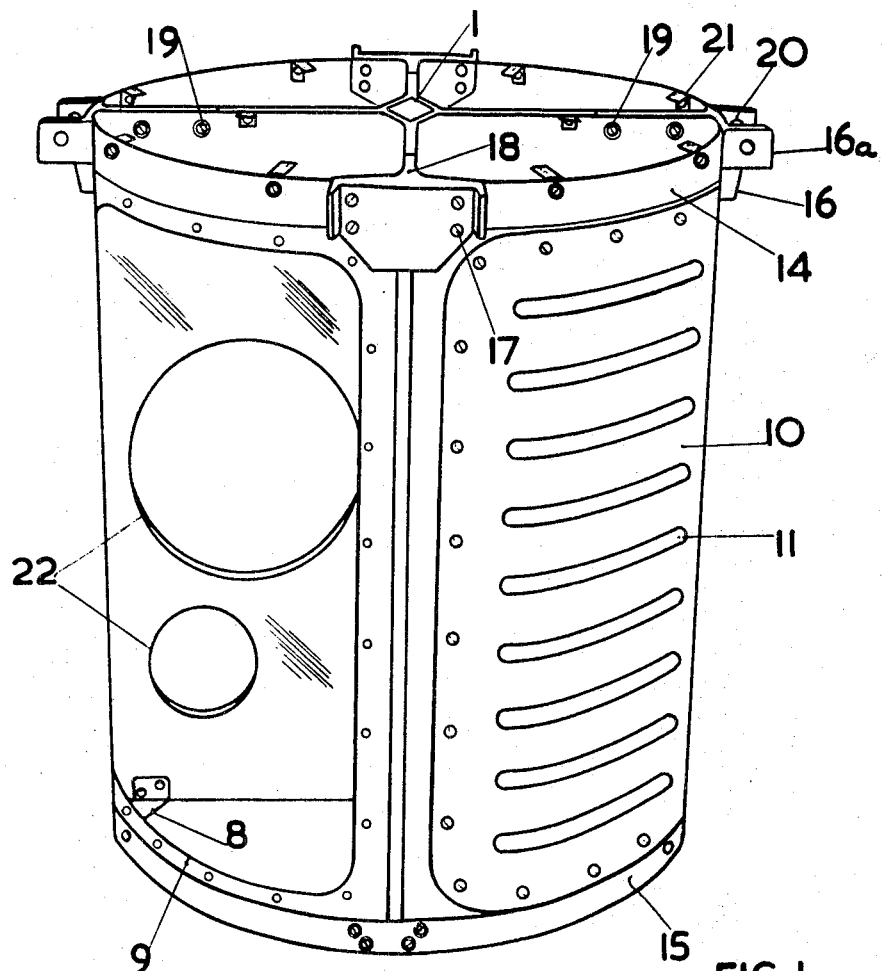
FIG. 1 is a perspective view of a satellite structure according to a first embodiment of the invention, with end caps and one fairing removed for clarity.
Figure 2:
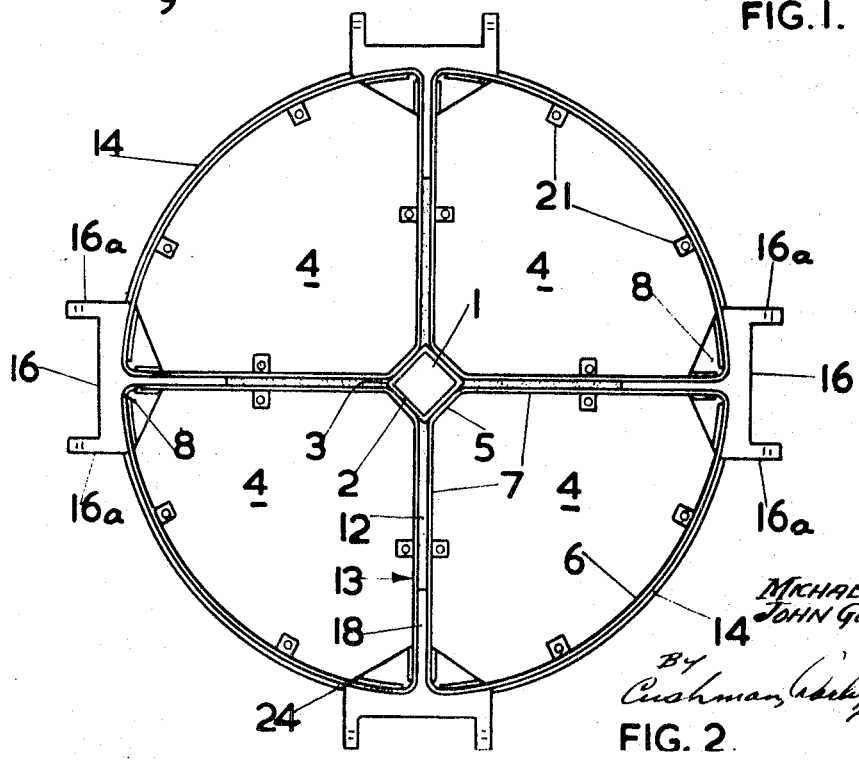
FIG. 2 is a plan view of the structure of FIG. 1.

Referring to FIGS. 1 and 2 of the drawings, a satellite structure in accordance with the first embodiment of the invention comprises a column 1 having inner end and outer surfaces of polygonal form. In this embodiment, the column is a hollow square tube, adjoining flat sides 2 of the outer surface of the column defining four straight edges 3.

Four shell members in the form of quadrants 4 each comprise a radially inner flat surface 5 and a radially outer curved surface 6, the ends of the surfaces 5 and 6 being connected together by two opposed flat walls 7.

The column and quadrants are manufactured by drawing silane finish E glass cloth through a solution composed of:

Standard epoxy resin—Epikote 828 [1]_____100 Parts by weight
Methyl nadic anhydride (hardener)____ 80
Benzyldimethylamine (accelerator)____ 1

[1] (Obtainable from Shell Chemicals UK Limited.)

and laying up five layers of impregnated cloth, each 0.008 inch thick, on to respective complementarily shaped metal mandrels. The column and quadrants are oven cured at 150°C. for 3 hours and the mandrels are then extracted from the glass cloth members. At the lower end of each quadrant (as viewed in FIG. 1) a reinforcing plastics gusset plate 8 is bolted and bonded in position between each flat wall 7 and the adjacent curved surface 6.

In order to gain access to the interior of the satellite after assembly, a substantially rectangular aperture 9 is cut in the curved surface 6 of each quadrant.

Four arcuate fairings 10 having an inner radius corresponding to that of the outer curved surface 6 of the quadrants and of such a size as to cover the apertures 9 are each manufactured in the following manner. A hollow mandrel is prepared having an appropriate quadrant cross section and a series of circumferentially directed parallel slots is provided in the curved surface of the mandrel. A layer of rubber is located over the outer curved surface of the mandrel to provide a resilient support across the slots. Silane finish E glass rovings impregnated with epoxy resin solution of the above stipulated composition are crosswound at a helix angle of 60° over the prepared mandrel. The tension of the rovings forces the rubber partly into the series of parallel slots and by this means the layers of rovings passing over the rubber-covered curved surfaces are formed with a series of ribs facing inwardly of the curved surface. After winding a thickness of 0.050 inch, the wound member is oven-cured as described above for the column and quadrants. After removing the mandrel a fairing 10 is cut from the curved wall of the wound member so as to include a series of ribs 11 to form stiffening means for the fairing. In an alternative fairing construction, two nonribbed curved walls are used to sandwich a layer of polyurethane foam to form the fairing, the foam providing stiffening in the same way as described below between the quadrants.

To assemble the satellite structure, the four quadrants 4 are located around the column 1 in a jig, the radially inner flat surfaces 5 of the quadrants being located in contact with their corresponding sides 2 of the column and adjacent flat walls 7 of adjacent quadrants disposed parallel to but spaced from one another to provide therebetween a cavity 12 into which a sheet of polyurethane foam is inserted.

Using the epoxy resin solution and curing time as described for the manufacture of the column and quadrants the radially inner flat surfaces 5 of the quadrants are bonded to the sides 2 of the column, and each pair of walls 7 with intermediate sheets of foam are bonded together to constitute a panel 13. The sheets of foam serve to stiffen the panels.

With this structural arrangement, each panel 13 projects radially from the column in a plane containing one of the straight edges 3 of the column, and a wall of each panel is secured to one of the two sides 2 of the column defining the corresponding edge.

Upper and lower ends of the structure are reinforced as at 14 and 15 respectively by circumferentially winding four layers of silane finish E glass rovings impregnated with epoxy resin solution as described for the manufacture of the column and quadrants, to provide a total reinforcement 0.048 inch thick and subsequently oven-curing the resin at 150°C. for 3 hours.

The reinforcement 14 at the top of the structure is cut away at 24 and between the quadrants to enable the insertion of four hinge brackets 16, machined from cast nylon. Each bracket 16 is secured by four screws 17 to the outer surface of the quadrants 4, a tongue 18 of each hinge bracket extending part way into the cavity 12 and being secured to the surfaces 6 by screws 19. Coaxial holes 20 in the arms 16a of the brackets allow solar paddles (not shown) to be hingedly connected to the structure.

Alternatively, but not illustrated, the reinforcement 14 is not cut away, and the brackets 16 are located to seat immediately below the reinforcement 14.

An upper flat circular end cap (not illustrated) is made from resin impregnated glass cloth and, after curing, is drilled for releasably mounting on small brackets 21 secured to the inner peripheral surface at the upper end of the structure and to the ends of the panels. The end cap may be ribbed and of a sandwich construction with polyurethane foam for additional stiffness and/or may be of domed configuration.

In order partly to receive the payload carried by the satellite, apertures 22 of appropriate size and shape to suit the various items of payload are provided in the panels 13. The items of payload are mounted with their centres of gravity coincident with the neutral plane of the respective panel and at such distance from the longitudinal axis of the column 1 as to dynamically balance the whole satellite about the longitudinal axis. The coincidence of the centres of gravity with the neutral planes of the panels minimises vibrational forces, especially on the payload. In addition, by having the centre of gravity so arranged the items of payload do not impose any moment on the panels 13 and therefore do not cause peeling of the surfaces 5 from the column 1. In addition vibration due to impulse loads is kept to a minimum.

With this construction of satellite and arrangement of payload, centrifugal forces arising from spinning of the satellite, typically 200 r.p.m., are transmitted to the central column along the panels 13, such forces being distributed across the surfaces 5 to cause a reaction in shear stress across the whole length and area of the sides of the column 1, rather than tensile stresses liable to produce peeling. In addition, the four identically shaped quadrants 4 avoid structural discontinuities by eliminating cut edges along the column. Also the thrust loads are conveniently imposed at the ends of each panel 13 and are transmitted as shear stress across the panels 13.

Furthermore, the hollow column 1 may be utilised as a conduit for wires or as a container for auxiliary battery cells. Moreover the hollow column may be filled for instance with a core of an elastomeric material to assist in damping out vibration. The structural arrangement also provides ease of access to any item of payload with minimum disturbance to the remainder.

It will further be appreciated that the use of resin bonded glass fibre provides a lightweight structure which does not produce any interference with or shield the transmission or reception by the instruments of radio and other electrical signals.

In an alternative method of manufacturing the satellite, the mandrel of the column may be left in position and used as part of the assembly jig whilst the remainder of the satellite and its payload are built up, the mandrel being withdrawn as a final operation.

Columns of solid cross section may be utilised in place of tubular ones provided a satisfactory bond is achieved between the materials of the column and quadrants.

In modifications of the invention various polygonal shapes may be utilised for the central column with an appropriate number of panels radiating from the column. For example, a column of triangular section may be constructed having three equiangularly spaced panels connected therewith. In an alternative arrangement a hexagonal column may have secured thereto three or preferably six equiangularly spaced panels. However, as the number of sides of the polygon increase and the peripheral shape approaches that of a circle, the stress applied on the connection between the panel and column changes from one of principally shear stress exerted tangentially across the whole width of the bonded surfaces, to one of tensile acting substantially normal to the bonded surfaces and which tends to separate the surfaces by a peeling action so that as small a number of sides to the column as possible are used.

Figure 3:
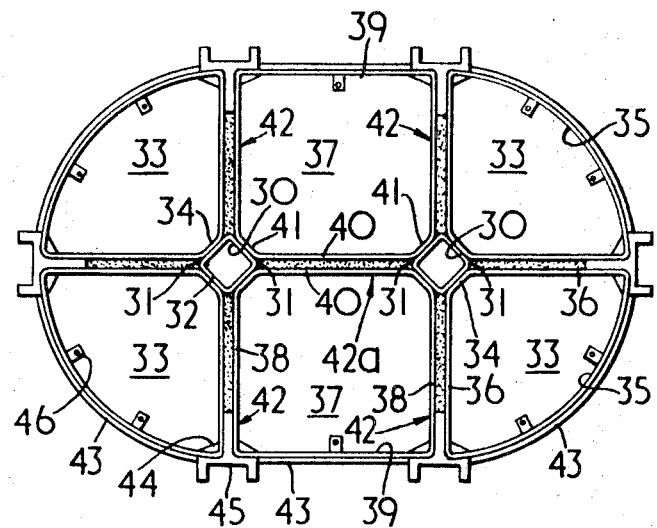
FIG. 3 is a diagrammatic plan view of a satellite structure according to a second embodiment of the invention.

In the second embodiment of the invention, a plurality of columns are provided, as illustrated in FIG. 3.

In this second embodiment a satellite structure comprises two columns 30 each having four edges, each edge 31 being formed by two adjoining flat sides 32, and four shell members in the shape of quadrants 33, each quadrant comprising a radially inner flat surface 34, a radially outer curved surface 35 and opposed flat walls 36. The columns and shell members are fabricated as described in the first embodiment. Additionally two shell members 37, each generally of rectangular shape in end view are manufactured by winding and curing resin impregnated glass cloth as described for the quadrants 33. Each shell member 37 comprises two opposed sidewalls 38, an outer wall 39 and an inner wall 40, the inner wall being connected to the sidewalls 38 by two relatively narrow web portions 41 each disposed at 45° to the inner and side walls.

The two columns 30 are jigged in parallel and spaced apart with an edge 31 of each column arranged opposite the other. The two rectangular shell members 37 are located between the columns, the web portions 41 each disposed against a side 32 of a column, and the inner walls 40 parallel to but spaced apart from one another. The four quadrants 33 are located two at each side of the pair of rectangular shell members 37 so that radially inner flat surfaces 34 of the quadrants 33 are located against the remaining sides of the columns 30.

Sheets of polyurethane foam are inserted between adjacent inner walls 40 of the pair of rectangular shell members 37, between the flat walls 36 of adjacent quadrants 33, and between adjacent walls of the quadrants and rectangular shell members. The complete assembly of columns 30 and shell members 33, 37 is resin bonded and oven-cured as described for the structure of the first embodiment, to form a lattice structure having a series of panels 42 projecting radially from each column 30, each panel projecting in a corresponding plane containing a respective one of the straight edges 31 of a column 30, one panel 42a being connected to each column thereby to connect them together.

Top and bottom ends of the structure are circumferentially wound as indicated by numeral 43 with resin impregnated glass rovings, and reinforcing gusset plates 44, paddle hinge brackets 45, and brackets 46 for the end cap are also fitted as required and in a similar manner to the first embodiment. It will be appreciated that in this second embodiment four arcuate fairings for the quadrants 33 and two flat fairings for the rectangular shell members 37 are necessary.

Instead of fabricating structures from glass reinforced plastics as described, other suitable materials may be employed, for example, carbon fibre reinforced plastics using the same resin solution detailed in the first embodiment. Such a material can have the same strength as glass reinforced plastics, the modulus of steel and the weight of magnesium. Other resin solutions may be employed such as the polyester resins. Further, instead of using sheets of polyurethane foam for stiffening the panels, other foamed plastics materials may be utilised; alternatively, a metal honeycomb layer may be employed with suitable bonding agents to bond the honeycomb to the flat walls of the panels.

Although the structural arrangements as described hereinbefore are intended primarily for structures fabricated from plastics material, the arrangements may also be adapted to metal structures by employing welding, brazing, or appropriate bonding techniques, for connecting shell members to columns and for connecting together adjacent walls of shell members to form the panels.

We claim:

1. A satellite structure which, in use, spins about a longitudinal axis and is constructed to withstand centrifugal forces resulting therefrom, the structure comprising at least one column of which the outer surface is polygonal so as to have a plurality of straight edges and flat sides, each straight edge being defined by two adjoining flat sides, and a plurality of panel members each of which extends radially from the column in a corresponding plane containing a respective one of said straight edges, each panel member comprising two spaced-apart parallel walls and, at the column, extensions of the walls which diverge from one another and are bonded to respective adjoining flat sides of the column, and at least some of the panel members having apertures provided therein to support items of payload.

2. A structure according to claim 1, comprising at least two of said columns, at least one of said panels extending between and bonded to two adjacent columns to connect them together.

3. A satellite structure which, in use, spins about a longitudinal axis and is constructed to withstand centrifugal forces resulting therefrom, the structure comprising a column of which the outer surface is polygonal whereby the column has a plurality of straight edges and flat sides, each straight edge being defined by two adjoining flat sides, and a plurality of shell members arranged around said column, each shell member having a radially inner flat surface and a radially outer surface, and two opposed flat walls connecting the longitudinally extending edges of the radially inner and outer surfaces, the radially inner flat surface of each shell being bonded to a corresponding flat side of the column, the flat walls of adjacent shell members forming panel members each of which extends radially from a straight edge of said column, at least some of the panel members having apertures provided therein to support items of payload.